United States Patent [19]
Patel et al.

[11] Patent Number: 5,925,182
[45] Date of Patent: Jul. 20, 1999

[54] STABLE LIQUID SUSPENSION COMPOSITIONS

[75] Inventors: Bharat B. Patel; Marshall D. Bishop, both of Bartlesville, Okla.

[73] Assignee: Phillips Petroleum Company, Bartlesville, Okla.

[21] Appl. No.: 09/116,447

[22] Filed: Jul. 16, 1998

Related U.S. Application Data

[62] Division of application No. 08/752,124, Nov. 20, 1996, Pat. No. 5,834,533.

[51] Int. Cl.$^6$ .............................. C08L 91/00; C08L 1/08; C08L 5/00; C08L 3/02
[52] U.S. Cl. .................. 106/266; 106/179.1; 106/180.1; 106/187.1; 106/189.1; 106/182.1; 106/203.1; 106/202.2; 106/217.7; 106/219; 106/220; 106/246; 106/247; 106/269; 106/311; 106/822; 106/823; 523/130; 524/35; 524/45; 524/47; 524/55; 524/555; 524/556; 524/565; 524/609
[58] Field of Search .................................. 106/246, 247, 106/266, 269, 311, 822, 823, 179.1, 180.1, 187.1, 189.1, 182.1, 203.1, 202.2, 217.7, 219, 220; 523/130; 524/555, 556, 565, 609, 35, 42–47, 50, 55–59

[56] References Cited

U.S. PATENT DOCUMENTS

| Re. 33,788 | 1/1992 | Clay | 149/1 |
|---|---|---|---|
| 4,181,546 | 1/1980 | Clay | 149/21 |
| 4,287,010 | 9/1981 | Owen, II | 149/2 |

*Primary Examiner*—Peter A. Szekely
*Attorney, Agent, or Firm*—Lucas K. Shay

[57] ABSTRACT

A stable liquid suspension composition comprising a liquid carrier, a solid fatty acid or a salt thereof, and a solid particulate is disclosed wherein said liquid carrier is selected from the group consisting of oils, olefins, terpenes, glycols, esters, ethers, alcohols, and combinations of any two or more thereof and said liquid carrier, solid fatty acid or salt thereof, and solid particulate are each present in said composition in a stabilizing amount sufficient to produce a stable liquid suspension. Also disclosed is a stable liquid composition comprising a liquid carrier, an oil-soluble polymer, and a solid particulate wherein said liquid carrier is selected from the group consisting of olefins, terpenes, esters, and combinations of any two or more thereof and said liquid carrier, oil-soluble polymer, and solid particulate are each present in said composition in a stabilizing amount sufficient to effect the formation of a stable liquid suspension.

19 Claims, No Drawings

STABLE LIQUID SUSPENSION COMPOSITIONS

This application is a division of application Ser. No. 08/752,124, filed Nov. 20, 1996 now U.S. Pat. No. 5,834,533.

FIELD OF THE INVENTION

This invention relates to a liquid suspension composition which can be used in a water-based fluid.

BACKGROUND OF THE INVENTION

Water-based fluids such as, for example, drilling fluids, milling fluids, mining fluids, water-based metal working fluids, food additives and water-based paints, are useful in a variety of industrial applications. It is well known to those skilled in the art of drilling wells to tap subterranean deposits of natural resources, such as gas, geothermal steam or oil, especially when drilling by the rotary method or the percussion method wherein cuttings must be removed from the bore hole, it is necessary to use a drilling fluid.

The use of water-based fluids in, for example, workover and completion fluids in oil field operations is also well known to those skilled in the art. Workover fluids are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc.

Completion fluids are those fluids used during drilling and during the steps of completion, or recompletion, of the well. Completion operation can include perforating the casing, setting the tubing and pump, etc. Both workover and completion fluids are used in part to control well pressure, to stop the well from blowing out while it is being completed or worked over, or to prevent the collapse of casing from over pressure.

Additives, chemicals or other materials, are often added to the water-based fluids for various reasons that include, but are not limited to, controlling water loss, increasing viscosity, reducing corrosion, inhibiting biodegradation, and increasing the density of the fluids. For example, chemicals such as, for example, water-thickening polymers serve to increase the viscosity of the water-based fluids, when used as workover fluids or completion fluids, to retard the migration of the brines into the formation and to lift drilled solids from the wellbore.

However, unless proper precautions are taken, these water-thickening polymers, when mixed into a water-based fluid, agglomerate to form partially hydrated polymer lump commonly called "fish-eyes" which are extremely slow to dissolve. Furthermore, the "fish-eyes" are often screened out with drilled solids by solids control equipment commonly used in the oil field operations. This leads to problems such as, for example, plugging of a shale shaker screen, poor performance of the polymers, and combinations thereof.

Dry additives other than polymers, for example, carbon black, neutralized asphalt sulfonate, lignite and combinations thereof, are insoluble or partially soluble in water or water-based fluids. The dry additives, besides causing the plugging problems, can be harmful to the health of workers if proper precautions are not taken when using the additives.

Liquid additives and processes therefor have been developed to overcome some of the problems associated with using dry additives. For example, although U.S. Pat. No. 5,091,448 provides an excellent stable liquid additive and process for preparing the stable liquid additive suspension, the liquid additive contains a hydrocarbon as a liquid carrier. Unfortunately, because hydrocarbons are in the liquid additive, it cannot be used in some areas where environmental regulations are of concern. U.S. Pat. No. 5,114,597 discloses a process for manufacturing a water-based drilling fluid wherein the process comprises mixing a hydrophobic carbon black and either a surfactant or a dispersant followed by shearing the resulting mixture to convert the hydrophobic carbon black to hydrophilic carbon black. However, a usable liquid additive of neutralized asphalt sulfonate or a blend that contains neutralized asphalt sulfonate as a component cannot be prepared by the process disclosed in the '597 patent because the additive becomes too viscous or solids settle out at the bottom of the additive.

It is therefore highly desirable to develop a liquid suspension composition which remains stable and is usable as an additive in water or water-based fluid. It would also be a significant contribution to the art if a stable liquid suspension composition that is also environmentally friendly for use in oil field applications is developed.

SUMMARY OF THE INVENTION

It is an object of the invention to provide a stable liquid suspension composition useful in oil field applications. It is another object of the invention to provide a process for producing the stable liquid suspension composition. It is also an object of the invention to provide a process for using the stable liquid suspension composition. Other objects, aspects, and advantages of the invention will become more apparent as the invention is more fully disclosed hereinbelow.

According to a first embodiment of the invention, a stable liquid suspension composition which can be used as an additive in a water-based fluid is provided. The composition can comprise, consists essentially of, or consists of a liquid carrier, a solid fatty acid or a salt thereof, and a solid particulate wherein the liquid carrier is selected from the group consisting of oils, liquid alkenes, terpenes, glycols, esters, ethers, alcohols, and combinations of any two or more thereof and the liquid carrier, solid fatty acid or salt thereof, and solid particulate are each present in the composition in a stabilizing amount sufficient to effect the formation of a stable liquid suspension. The water-based fluid can be used in or as drilling fluids completion fluids, workover fluids, cements, other applications, or combinations of any two or more thereof.

According to a second embodiment of the invention, a stable liquid suspension composition which can be used as an additive in a water-based fluid and is also environmentally friendly is provided. The composition can comprise, consist essentially of, or consist of a liquid carrier, an oil-soluble polymer, and a solid particulate wherein the liquid carrier can be selected from the group consisting of liquid alkenes, terpenes, esters, and combinations of any two or more thereof.

DETAILED DESCRIPTION OF THE INVENTION

The term "stable liquid suspension" employed herein refers to, unless otherwise indicated, a liquid suspension that, after 3, preferably 5, and most preferably 10 days of storage at 25° C., remains flowable and has little or no settlement of solids. The term "water-based composition"

referred to in the invention denotes a composition containing either water, a solution, or a suspension wherein the solution or suspension contains dissolved, partially dissolved, or undissolved salts. Examples of salts that can be present in an aqueous composition in the present invention include, but are not limited to, sodium chloride, sodium bromide, sodium iodide, potassium chloride, potassium bromide, calcium chloride, calcium bromide, calcium nitrate, magnesium chloride, magnesium bromide, barium chloride, zinc chloride, zinc bromide, sodium sulfate, strontium chloride, and mixtures thereof. Generally the total salts content in the composition can vary widely from 0% (distilled water) to as high as 80 weight %. The typical total salts content is in the range of from about 0.001 weight % to about 30 weight %. For example, a produced brine which is defined as the brine co-produced with oil or gas, or both, which generally is a hardness brine, i.e., containing at least 1,000 ppm of $Ca^{+2}$, $Ba^{+2}$, $Mg^{+2}$, or $Sr^{+2}$, or combinations thereof. A produced brine generally contains high salinity of from about 1% to about 30% total dissolved solids.

The term "liquid carrier" used in the invention refers to, unless otherwise indicated, a liquid which is not water and does not include any aqueous component.

According to the first embodiment of the invention, a stable liquid suspension composition useful in a water-based fluid which can be used in oil field applications is provided which comprises, consists essentially of, or consists of a liquid carrier; a solid fatty acid or salt thereof; and a solid particulate. The liquid carrier can be any liquid that, when employed in the invention composition, can effect the production of a stable liquid suspension. It can be selected from the group consisting of an oil, a liquid alkene, a terpene, a glycol, an alcohol, an ester, an ether, and combinations of any two or more thereof. Examples of suitable oils include, but are not limited to, mineral oil, vegetable oils, crude oil, diesel, kerosene, pentane, decane, soybean oil, corn oil, and combinations of any two or more thereof. Liquid alkenes include linear, cyclic, and branched liquid alkenes such as 1-alkenes and polyolefins having about 8 to about 40, preferably about 8 to about 35, and most preferably 10 to 30 carbons per molecule can be used. Examples of suitable olefins include, but are not limited to, decenes, dodecenes, tridecenes, tetradecenes, pentadieneso, hexadecenes, octadecenes, eicosene, docosene, pentacosene, hexacosene, and combinations of any two or more thereof. Alcohols can be linear alcohols or branched alcohols having about 5 to about 30, preferably about 5 to about 20, and most preferably 6 to 20 carbon atoms per molecule. Examples of suitable alcohols include, but are not limited to, hexanol, octanol, decanol, isopropyl alcohol, alcohol alkoxylates produced by reacting an epoxide such as ethylene oxide with an alcohol, and combinations of any two or more thereof. Suitable esters can be any liquid carboxylic esters, phenolic esters, malonic esters, sulfonic esters, or combinations of any two or more thereof. Examples of suitable esters include, but are not limited to, pentyl acetate, isopentyl acetate, benzyl acetate, ethyl otanoate, ethyl decanoate, ethyl dodecanoate, ethyl malonate, ethyl phenylacetate, ethyl benzoate, phenyl propionate, and combinations of any two or more thereof. Examples of suitable terpenes include, but are not limited to, limonene, menthol, piperitone, menthyl acetate, neomenthol, pulegone, spearmint ((-)-carvone), carvyl acetates, commint, scotch mint, peppermint, α-pinene, β-pinene, linalool, nerol, α-terpinene, menthofuran, β-terpinene, γ-terpinene, myrcene, geraniol, geranial, neral, citronellal, menthone, isomenthone, 1,8-cineole, ascaridole, bornneol flavonone, terpinolene, sabinene, camphene, citronellol, and combinations of any two or more thereof. Examples of suitable glycols include, but are not limited to, ethylene glycol, propylene glycol, diethylene glycol, dipropylene glycol, polyethylene glycol, polypropylene glycol, and combinations of any two or more thereof. The presently preferred liquid carrier is a polypropylene glycol because it is commercially readily available and effective.

Polypropylene glycols are commercially available glycol-based polymers. A polypropylene glycol is the product of a propylene oxide polymerization. Generally, a suitable polypropylene glycol can have a molecular weight in the range of from about 400 to about 7,500, preferably about 1,000 to about 6,000, more preferably about 1,200 to about 5,000, and most preferably 1,500 to 4,500. Furthermore, the polypropylene glycol polymer useful in the invention can also be a polypropylene glycol having one or more methyl groups attached to the propylene units of the polymer.

Any solid particulate that is substantially insoluble, or partially soluble, in a liquid carrier disclosed above can be used in the present invention. The term "partially soluble" refers to a solubility of less than about 75 weight %, preferably less than about 50 weight %, and most preferably less than 25 weight % of the solid particulate in the liquid carrier. Examples of suitable solid particulates include, but are not limited to, polymers, herbicides, insecticides, sulfonated asphalt, salts of sulfonated asphalt, lime, sodium bicarbonate, sodium carbonate, molybdenum disulfide, sodium hydroxide, graphite, zinc, tin, quebracho, lignin, lignite, caustisized lignite, lignosulfonate, chrome lignosulfonate, naphthalenesulfonate, unintahite (gilsonite), and combinations of two or more thereof.

Any polymer that can increase the viscosity of a water-based composition can be used in the invention. The term "polymer" used herein denotes, unless otherwise indicated, a homopolymer, a copolymer, a terpolymer, or a tetrapolymer. Polymers suitable for use in the stable liquid suspension composition include, but are not limited to, polysaccharides, cellulose or cellulose ethers, acrylamide-based polymers, miscellaneous polymers, and combinations of any two or more thereof. These polymers are commercially available.

Example of suitable cellulose ethers are those disclosed in U.S. Pat. No. 3,727,688. The particularly preferred cellulose ethers include, but are not limited to, carboxymethylhydroxyethyl cellulose, carboxymethyl cellulose, methyl cellulose, hydroxypropylmethyl cellulose, hydroxypropyl cellulose, hydroxyethyl cellulose, and combinations of two or more thereof.

The term "polysaccharide" used herein refers to, unless otherwise indicated, macromolecules composed of many monosaccharide units such as, for example, glucose linked by glycosidic bonds. Examples of polysaccharides include, but are not limited to, starches, gums, heteropolysaccharides, and combinations of two or more thereof.

Examples of suitable starches include those selected from the group consisting of carboxymethylstarch, hydroxyethylstarch, hydroxypropylstarch, and combinations thereof.

Examples of suitable gums are those selected from the group consisting of arabic, trajacanth, karaya, shatti, locust bean, guar, psyllium seed, quince seed, agar, algin, carrageenin, furcellaran, pectin, gelatin, larch gum, and combinations of two or more thereof.

Suitable heterobiopolysaccharides can be those disclosed in U.S. Pat. No. 4,068,714 such as polysaccharide B-1459 which is biopolysaccharide produced by the action of *Xanthomonas campestris* bacteria. Examples of suitable heterobiopolysaccharides can also include those selected from the group consisting of polysaccharide produced by the action of *Xanthomonas campestris, Xanthomonas phaseoli, Xanthomonas mulvacearn, Xanthomonas carotae, Xanthomonas translucens, Xanthomonas hederade, Xanthomonas papavericoli, Hansenula holstii, Arthorobacter viscous, Methylomonas mucosa, Erwinia tahitica* and *Azotobacter indicus*.

Suitable acrylamide-containing polymers are thermally stable polymers having repeat units derived from acrylamide and optionally one olefinic comonomer. Generally, any olefinic comonomer which can be co-polymerized with acrylamide can be used in the present invention. Examples of suitable olefinic comonomers include, but are not limited to, R—C(R)═C(R)—C(O)—C(R)(R), R—C(R)═C(R)—C(O)—N(R)—Y—R, R—C(R)═C(R)—C(O)—G—Y—Z, R—C(R)═C(R)—C(O)—G—Y—W, $CH_2$═CH—C(O)—N(R)—$(CH_2)_n$—$CH_3$, and combinations of any two or more thereof where each R can be the same or different and is each selected from the group consisting of hydrogen, alkyl radicals, aryl radicals, aralkyl radicals, alkalkyl radicals, cycloalkyl radicals, and combinations of any two or more thereof wherein each radical can contain 1 to about 12 carbon atoms; G is O or NH; Y is an alkylene radical having 1 to about 10, preferably 1 to about 7, and most preferably 1 to 4 carbon atoms and can contain substituents selected from the group consisting of hydroxy group, halides, amino groups, alkyl radicals, aryl radicals, alkaryl radicals, aralkyl radicals, cycloalkyl radicals, and combinations of any two or more thereof wherein each carbon-containing radical has 1 to about 12 carbon atoms; W is an acid moiety selected from the group consisting of phosphonic acids, phosphoric acids, phosphinic acids, sulfuric acids, sulfonic acids, sulftirous acids, sulfinic acids, carboxylic acids, alkali metal salts of the acids, ammonium salts of the acids, and combinations of any two or more thereof; Z has a formula selected from the group consisting of N(R)(R), $N^+(R)(R)(R)X^-$, and combinations of any two or more thereof wherein R is the same as above and X can be any inorganic anion selected from the group consisting of sulfonates, sulfinates, sulfates, phosphonates, phosphinates, phosphates, halides, nitrates, and combinations of any two or more thereof; and n is a number of from 0 to about 10. More specific examples of suitable olefinic comonomers include, but are not limited to, vinyl acetate, vinylpyridine, styrene, methyl methacrylate, acryloylpiperazine, methacryloylpiperazine, methacryloylmorpholine, methacrylamide, acrylonitrile, methacrylic acid, ammonium salt of methacrylic acid, alkali metal salts of methacrylic acid, 2-methacryloyloxyethyltrimethylamine, 2-acrylamido-2-methylpropane sulfonic acid, alkali metal salts of 2-acrylamido-2-methylpropane sulfonic acid, 2-methacryloyloxyethane sulfonic acid, alkali metal salts of 2-methacryloyloxyethane sulfonic acid, acryloylmorpholine, N-4-butylphenylacrylamide, 2-acrylamido-2-methylpropane dimethylammonium chloride, 2-methacryloyloxyethyldiethylamine, 3-methacrylamidopropyldimethylamine, vinylsulfonic acids, alkali metal salts of vinylsulfonic acid, styrene sulfonic acid, alkali metal salts of styrene sulfonic acid, N-vinyl-2-pyrrolidone, and combinations of any two or more thereof. The presently preferred comonomers are 2-acrylamido-2-methylpropane sulfonic acid, alkali metal salts of 2-acrylamido-2-methylpropane sulfonic acid, N-vinyl-2-pyrrolidone, or combinations of any two or more thereof. The presently preferred acrylamide-containing polymers are copolymers of N-vinyl-2-pyrrolidone and acrylamide, terpolymers of sodium 2-acrylamide-2-methylpropanesulfonate, acrylamide and N-vinyl-2-pyrrolidone, copolymers of sodium 2-acrylamido-2-methyl-2-propanesulfonate and acrylamide, and combinations of any two or more thereof for applications in high salinity environments at elevated temperatures. Selected terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and other polymers containing acrylate groups. Generally, the mole percent of acrylamide is in the range of from about 15 to about 100%, preferably about 20 to about 85%, and most preferably 20 to 80%. Olefinic comonomer, if present, makes up the rest of the mole percent.

Other miscellaneous polymers suitable for use in the present invention include partially hydrolyzed polyacrylonitrile, polystyrene sulfonate, lignosulfonates, and methylolated polyacrylamides.

Based on the total weight % of a liquid suspension composition of the present invention, the solid particulate can be present in the composition in any weight % and can be in the range of from about 15 weight % to about 70 weight %, preferably about 20 weight % to about 60 weight %, and most preferably 30 weight % to 50 weight %.

The term "fatty acid", as used herein, unless otherwise indicated, is referred to an aliphatic carboxylic acid, an aryl carboxylic acid, a fatty acid salt, or combinations of two or more thereof. Suitable carboxylic acids include, but are not limited to, linear carboxylic acids having about 8 to about 40, preferably aobut 10 to aobut 30, and most preferably 12 to 20 carbon atoms such as, for example, octanoic, nonanoic, decanoic, undecanoic, dodecanoic, tridecanoic, tetradecanoic, pentadecanoic, hexadecanoic, heptadecanoic, ocitadecanoic (stearic acid), nonadecanoic, eicosanoic, heneicosanoic, docosanoic, tricosanoic, tetraosanoic, pentacosanoic, hexacosanoic, heptacosanoic, octacosanoic, nonacoisanoic, triacontanoic, hentricontanoic, dotriacontanoic, tetratriacontanoic, and sentatrioacontanoic acid. In addition, the carboxylic acids useful in the present invention may contain branched carbon chains or pendant carboxyl groups such as, for example, iso-lauric or iso-stearic acid.

Fatty acid salts suitable for use in the present invention are typically high melting solids and include the Group I, II, III or IV of the Periodic Table of The Elements, as shown in the CRC Handbook of Chemistry and Physics, 67th edition (1986–1987 CRC Press, Boca Raton, Fla), metal salts of those fatty acids having from about 8 to about 40, more preferably from about 10 to about 30, and most preferably 12 to 20 carbon atoms per molecule. Examples of suitable fatty acid salts include, but are not limited to, the aluminum, calcium, magnesium, sodium, and zinc salts of lauric, myristic, palmitic and stearic acids. The presently preferably fatty acid salt is calcium stearate for it is readily available.

The weight % of the fatty acid or salt thereof can be in the range of from about 1 to about 30%, preferably about 2 to about 25%, and most preferably 3 to 20% based on the total weight of the liquid suspension composition equaling 100%.

The liquid carrier disclosed above generally makes up the rest of the liquid suspension composition.

According to the second embodiment of the invention, a stable liquid suspension composition is provided which comprises, consists essentially of, or consists of a liquid carrier, an oil-soluble polymer, and a solid particulate. The liquid carrier can be selected from the group consisting of liquid alkenes, terpenes, esters, and combinations of any two or more thereof. The liquid carrier can comprise a minor amount of a paraffin, an alcohol, or combinations of any two or more thereof. Examples of suitable liquid alkenes, terpenes, and esters can be the same as those disclosed in the first embodiment of the invention. The definition, and scope of the solid particulate can also be the same as those disclosed in the first embodiment of the invention except that the solid particulate polymers are water-soluble polymers.

Any oil soluble polymers that can form a stable liquid suspension composition with a liquid carrier and a solid particulate disclosed above can be used in the present invention. Examples of suitable oil-soluble polymers include, but are not limited to, polystyrene, polybutene, copolymers of styrene and isoprene, copolymers of styrene and ethylene, copolymers of styrene and propylene, copolymers of styrene, ethylene, and propylene, copolymers of styrene and butene, copolymers of styrene and isobutene, copolymers of styrene and butadiene, copolymers of ethylene and propylene, and combinations of any two or more thereof. These polymers can be block copolymers, random copolymers, or combinations thereof. The presently preferred oil-soluble polymers are block copolymers of styrene and isoprene, hydrogenated block copolymers of styrene and isoprene, and copolymers of styrene and butadiene, hydrogenated copolymers of styrene and butadiene, and combinations of any two or more thereof.

The oil-soluble polymer can be present in the composition in the range of from about 0.1 to about 10 weight percent (%) preferably about 0.2 to about 8%, and most preferably 0.3 to 5%. The solid particulate can be present in the composition in the range of from about 15 to about 70%, preferably about 20 to about 60%, and most preferably 30 to 50%. Similar to the first embodiment of the invention, the liquid carrier makes up the rest of the liquid suspension composition of the second embodiment of the invention.

The stable liquid suspension composition disclosed in either the first or the second embodiment of the invention can be prepared by any mixing means, such as, for example, a blender, known to one skilled in the art.

Water, an aqueous solution, or a suspension containing water, can generally be used to prepare a water-based fluid containing the liquid suspension composition of the invention for oil field applications. A produced brine which is an oil field brine coproduced with oil or gas or both can also be used as a component of a water-based fluid. The liquid suspension composition of the invention can be present in the water-based fluid in the range of from about 0.01 to about 90, preferably about 0.1 to about 80, and most preferably 1 to 50 weight %. Water, solution, suspension, or produced brine generally makes up the rest of the water-based fluid containing the composition of the invention.

A weighing agent can be added to a water-based fluid containing the liquid suspension composition in any amount to increase the density of the water-based fluid to a desired density. Suitable weighing agents include, but are not limited to, barite, hematite, carbonates, galena, and combinations of two or more thereof.

The water-based fluid can also contain a clay. The clay useful in the invention can be any clay. Examples of suitable clays include, but are not limited to, kaolinite, halloysite, vermiculite, chlorite, attapulgite, smectite, montmorillonite, illite, saconite, sepiolite, palygorskite, Fuller's earth, and mixtures thereof. The presently preferred clay is montmorillonite clay. The presently most preferred clay is sodium montmorillonite, which is also known as bentonite clay can be present in the water-based fluid in any amount known to one skilled in the art.

According to the invention, a process for retaining the viscosity of or controlling water loss of a clay-containing water-based fluid is also provided which comprises contacting the fluid with a liquid suspension composition which can be the same as the liquid suspension composition disclosed above.

The clay-containing, water-based fluid can be used in well treating, drilling, workover, or completion in oil field operations by those skilled in the art. Generally, the viscosified aqueous composition can be used in any drilled wells having a temperature in the range of from about 70° F. to about 450° F, preferably about 75° F. to about 350° F., and most preferably 80° F. to 300° F. Because these oil field operations are well known to those skilled in the art, descriptions of which are omitted herein for the interest of brevity.

The following specific examples are intended to illustrate the advantages of the present invention and are not intended to unduly limit the scope of the invention.

EXAMPLE I

Four compositions were prepared by mixing the components shown in Table IA with a Hamilton Beach Malt mixer in glass bottles. The mixing time after the addition of each component is shown in the table. After the mixing was completed, the bottles were capped and then they were kept undisturbed at about 75° F. The compositions were observed at various times. Observations of the composition are provided in Table IB. The compositions were also observed for flowability by turning the bottles to one of the sides. After the such observations, the bottles were shaken very gently for five seconds and, after removing caps, they were turned over. The liquid composition that flowed out in five minutes after turning over the bottle was weighed and the percent of a composition flowed out from the bottle was calculated. These results are provided under "% Flowed" in Table IB.

TABLE IA[a]

| Run | Materials Used |
|---|---|
| 1 | 22 g Soltrol ® 170[a] + 20 g Drispac ® Regular (five minutes) |
| 2 | 22 g Soltrol ® 170 + 28 Drispac ® Regular (five minutes) |
| 3 | 22 g Soltrol ® 170 + 8 g Ca-stearate Regular (one minutes) + 20 g Drispac ® Regular (five minutes) |
| 4 | 20 g Soltrol ® 170 + 10 g Ca-stearate Regular (one minutes) + 20 g Drispac ® Regular (five minutes) |

[a]Soltrol ® 170 is a mineral oil obtained from Phillips Petroleum Company, Bartlesville, Oklahoma; Drispac ® Regular is a carboxymethyl cellulose also obtained from Phillips Petroleum Company; and Ca-stearate Regular was obtained from Witco Corporation, Houston, Texas.

TABLE IB

| Run | Time at 75° F. | Observations | % Flowed[a] |
|---|---|---|---|
| 1 | One Hour | Separated in two phases, about 35% by volume clear liquid on top and 65% white sludge at bottom, the sludge did not flow when the bottle was turned to side indicating that the solids had settled and compacted | 74 |
| 2 | One Hour | Separated in two phases, about 15% by volume clear liquid on top and 85% white sludge at bottom, the sludge did not flow when the bottle was turned to side indicating that the solids had settled and compacted | 68 |
| 3 | One Hour | Very homogeneous and no separation, whole composition flowed when the bottle was turn to side | |

TABLE IB-continued

| Run | Time at 75° F. | Observations | % Flowed[a] |
|---|---|---|---|
| 4 | One Hour | Very homogeneous, no separation, whole composition flowed when the bottle was turned to side | |
| 3 | 3 Days | About 5% by volume clear liquid on the surface, whole composition flowed when the bottle was turned to side | |
| 4 | 3 Days | Very homogeneous and no separation, the composition did not flow when the bottle was turned to side | |
| 3 | 175 Days | About 5% by volume clear liquid on the surface, only liquid from the surface flowed when the bottle was turned to side | 92 |
| 4 | 175 Days | About 5% by volume clear liquid on the surface, only liquid from the surface flowed when the bottle was turned to side | 86 |

$${}^a\% \text{ Flowed} = \frac{\text{Weight of composition that flowed out of the bottle}}{\text{Weight of composition}} \times 100$$

The results shown in Table IB indicate that the invention compositions (runs 3 and 4) remained stable for a longer period than runs 1 and 2 that did not contain calcium stearate. Runs 1 and 2 separated completely in only one hour after they were kept undisturbed. To the contrary, after 175 days, runs 3 and 4 were substantially stable. Furthermore, after shaking, a significantly higher percentage of the composition of runs 3 and 4 flowed out of the containers. These results further indicate that the invention compositions of runs 3 and 4 would be easier and more efficient for the end uses, for example, as a drilling fluid additive.

EXAMPLE II

Three compositions were prepared by mixing the component shown in Table IIA with a Hamilton Beach Malt mixer in glass bottles. The mixing time after the addition of each component is shown in the table. After the mixing was completed, the bottles were capped and then they were kept undisturbed at around 75° F. The compositions were observed at various times. The observations are provided in Table IIB. The compositions were also observed for flowability by turning the bottles to one of the sides. Next, the bottles were shaken very gently for five seconds and, after removing caps, they were turned over. The liquid composition that flowed out in five minutes after turning over the bottle was weighed and the percent of the composition flow out from the bottle was calculated. These results are provided under "% Flowed" in Table IIB.

TABLE IIA

| Run | Materials Used |
|---|---|
| 1 | 22 g C501 bottoms[a] + 18 g Drispac ® Regular[b] (five minutes) |
| 2 | 22 g C501 bottoms + 23 g Drispac ® Regular (five minutes) |
| 3 | 22 g C501 bottoms + 5 g Ca-stearate Regular (one minutes) + 18 g Drispac ® Regular (five minutes) |

[a]C501 bottoms is a mixture of liquid alkenes and paraffins of 12 to 26 carbons and is obtained from bottoms of liquid alkenes production. It was obtained from Ethyl Corporation, Baton Rouge, Louisiana.
[b]See Table IA.

TABLE IIB

| Run | Time at 75° F. | Observations | % Flowed[a] |
|---|---|---|---|
| 1 | One Hour | Separated in two phases, about 25% by volume clear liquid on top and 75% white sludge at bottom, the sludge did not flow when the bottle was turned to side indicating that the solids had settled and compacted | 68 |
| 2 | One Hour | Separated in two phases, about 15% by volume clear liquid on top and 85% white sludge at bottom, the sludge did not flow when the bottle was turned to side indicating that the solids had settled and compacted | 65 |
| 3 | One Hour | Very homogeneous and no separation, whole composition flowed when the bottle was turned to side | |
| 3 | 3 Days | About 15% by volume clear liquid on the surface, whole composition flowed when the bottle was turned to side | |
| 3 | 175 Days | About 20% by volume clear liquid on the surface, only liquid from the surface flowed when the bottle was turned to side | 94 |

[a]See Table IB.

The observations in Table IIB indicate that the invention composition (run 3) remained stable for a longer period than runs 1 and 2 that did not contain calcium stearate. Runs 1 and 2 separated completely in only one hour after they were kept undisturbed. However, after 175 days, run 3 was substantially stable. Further, after shaking, a significantly higher percentage of the composition of run 3 flowed out of the bottle. These results also indicate that the invention composition of run 3 would be easier and more efficient for the end uses, for example, as a drilling fluid additive.

EXAMPLE III

Three compositions were prepared by mixing the components shown in Table IIIA with a Hamilton Beach Malt mixer in glass bottles. After the mixing of all components, the liquid compositions were mixed about 5 minutes. The compositions were heated to about 120° F. and then they were mixed 15 minutes. After keeping them two hours at about 75° F., they were mixed one minute. The bottles were capped and then kept undisturbed at about 75° F. The compositions were observed for stability at various times. The observations are provided in Table IIIB.

TABLE IIIA

| Run | Materials Used |
|---|---|
| 1 | 30 g PPG 4000[a] + 20 g copolymer[b] |
| 2 | 28 g PPG 4000 + 22 g copolymer |
| 3 | 28 g PPG 4000 + 20 g copolymer + 2 g Ca-stearate Regular |

[a]PPG 4000 is a polypropylene glycol having a molecular weight of about 4000 obtained from Dow Chemicals, Midland, Michigan.
[b]It is a copolymer of acrylamide (50 weight %) and sodium 2-acrylamido-2-methylpropane sulfonate (50 weight %) obtained from Phillips Petroleum Company, Bartlesville, Oklahoma.

TABLE IIIB

| Run | Time at 75° F. | Observations |
|---|---|---|
| 1 | 4 Hours | Clear liquid (PPG 4000) on the surface and solids started to settle at bottom |
| 2 | 4 Hours | Clear liquid (PPG 4000) on the surface and solids started to settle at bottom |

TABLE IIIB-continued

| Run | Time at 75° F. | Observations |
|---|---|---|
| 3 | 4 Hours | Very homogeneous composition |
| 1 | 3 Days | Clear liquid (PPG 4000) on the surface and settling of solids at bottom |
| 2 | 3 Days | Clear liquid (PPG 4000) on the surface and settling of solids at bottom |
| 3 | 3 Days | Very homogeneous composition, no clear liquid on the surface |
| 3 | 11 Days | Very homogeneous composition, no clear liquid on the surface |
| 3 | 62 Days | Slightly clear liquid on the surface, easily flowable, more than 80% of composition flowed out of the bottle when the bottle was opened up and turned over in 10 minutes |

The observations in Table IIIB indicate that the inventive liquid composition (run 3) remained stable for at least 60 days. Runs 1 and 4, which did not contain calcium stearate, became unstable in only 4 hours.

EXAMPLE IV

Six compositions were prepared by mixing the components shown in Table IVA with a Hamilton Beach Malt mixer in glass bottles. The mixing time after the addition of each component is shown in the table. After the mixing of Shellvis® 40, the bottles of run 2, 4 and 6 were capped and kept in an oven at about 160° F. for about 30 minutes. The heated compositions were shaken vigorously and, after cooling them to about 90° F., Drispac polymer was added and the resulting suspension was further mixed. After the mixing of all components, all the bottles were capped and then kept undisturbed at around 75° F. The compositions were observed for stability at various time. The observations are provided in Table IVB.

TABLE IVA

| Run | Materials Used |
|---|---|
| 1 | 46.4 g of tetradecene-1 + 32 g Drispac ® Regular[a] (15 minutes) |
| 2 | 46.4 of tetradecene-1 + 1.6 g Shellvis ® 40[b] (one minute) + 32 g Drispac Regular (15 minutes) |
| 3 | 46.4 g of tetradecene-1/tetradecane[c] + 32 g Drispac ® Regular (15 minutes) |
| 4 | 46.4 g of tetradecene-1/tetradecane + 1.6 g Shellvis ®[a] 40 (one minute) + 32 g Drispac ® Regular (15 minutes) |
| 5 | 46.4 g of C1830 liquid alkene alcohol[d] + 32 g Drispac ® Regular (15 minutes) |
| 6 | 46.4 g of C1830 liquid alkene alcohol + 1.6 g Shellvis ® 40 (one minute) + 32 g Drispac ® Regular (15 minutes) |

[a]See Table IA
[b]A hydrogenated block copolymer of styrene and isoprene, obtained from Shell Oil Company, Houston, Texas.
[c]Contained 17 weight % tetradecane.
[d]C1830 liquid alkene alcohol is a mixture of hydrocarbons and alcohols obtained from AMOCO Chemical Company, Chicago, Illinois.

TABLE IVB

| Run | Time at 75° F. | Observations |
|---|---|---|
| 1 | One Day | Separated in two phases, about 25% by volume clear liquid on top and 75% white sludge at bottom, the sludge did not flow when the bottle was turned to side indicating the solids had settled and compacted |
| 2 | One Day | Very homogeneous and no separation, whole composition flowed when the bottle was turned to side |

TABLE IVB-continued

| Run | Time at 75° F. | Observations |
|---|---|---|
| 3 | One Day | Separated in two phases, about 25% by volume clear liquid on top and 75% white sludge at bottom, the sludge did not flow when the bottle was turned to side indicating the solids had settled and compacted |
| 4 | One Day | Very homogeneous and no separation, whole composition flowed when the bottle was turned to side |
| 5 | One Day | Separated in two phases, about 25% by volume clear liquid on top and 75% white sludge at bottom, the sludge did not flow when the bottle was turned to side indicating the solids had settled and compacted |
| 6 | One Day | Very homogeneous and no separation, whole composition flowed when the bottle was turned to side |
| 2 | 13 Days | Very homogeneous and no separation, whole composition flowed when the bottle was turned to side |
| 4 | 13 Days | Very homogeneous and no separation, whole composition flowed when the bottle was turned to side |
| 6 | 12 Days | Very homogeneous and no separation, whole composition flowed when the bottle was turned to side |
| 2 | 29 Days | Very homogeneous and no separation, whole composition flowed when the bottle was turned to side |
| 4 | 29 Days | Very homogeneous and no separation, whole composition flowed when the bottle was turned to side |
| 6 | 28 Days | Very homogeneous and no separation, whole composition flowed when the bottle was turned to side |
| 4 | 90 Days | Very homogeneous and no separation, whole composition flowed when the bottle was turned to side |
| 6 | 89 Days | About 5% by volume liquid on the surface, whole composition flowed when the bottom was turned on side |

The observations in Table IVB indicate that the invention compositions (runs 2, 4, and 6) remained stable for a longer period than runs 1, 3, and 5 that did not contain Shellvis® 40. Runs 1, 3, and 5 separated completely in only one day after they were kept undisturbed. On the other hand, after about one month, runs 2, 4, and 6 remained stable and flowable.

EXAMPLE V

Four compositions were prepared by mixing the components shown in table VA with a Hamilton Beach Malt mixer in glass bottles. After the mixing of all components, the liquid compositions were mixed about five minutes. The compositions were heated to about 120° F. and then they were mixed 15 minutes. After keeping them two hours at about 75° F., they were further mixed for one minute. The bottles were capped and then kept undisturbed at around 75° F. The compositions were observed for stability at various intervals as shown in Table VB.

TABLE VA

| Run | Materials Used |
|---|---|
| 1 | 23.4 g of tetradecene-1 + 16 g of sodium asphalt sulfonate |
| 2 | 23.4 g of tetradecene-1 + 16 g of sodium asphalt sulfonate + 1.0 g Shellvis ®[a] 40 |
| 3 | 16.0 g of d-limonene + 10 g sodium asphalt sulfonate |
| 4 | 16.0 g of d-limonene + 10 g sodium asphalt sulfonate + 1.0 g Shellvis ® 40 |

[a]See Table IVA

TABLE VB

| Run | Time at 75° F. | Observations |
|---|---|---|
| 1 | 4 Hours | Separated badly, black sludge had settled at the bottom |
| 2 | 4 Hours | Very homogeneous and no separation |
| 3 | 4 Hours | Separated badly, black sludge had settled at the bottom |
| 4 | 4 Hours | Very homogeneous and no separation |
| 2 | 3 Days | Very homogeneous and no separation |
| 4 | 3 Days | Very homogeneous and no separation |
| 2 | 11 Days | Very homogeneous and no separation |
| 4 | 11 Days | Very homogeneous and no separation |
| 2 | 42 Days | Very slight liquid on the surface, easily flowable, more than 80 of composition flowed out of the bottle when the bottle was opened up and turned over in 10 minutes |
| 4 | 42 Days | Very slight liquid on the surface, easily flowable, more than 80 of composition flowed out of the bottle when the bottle was opened up and turned over in 10 minutes |

The observations in Table VB indicate that the invention compositions (runs 2 and 4) remained stable for a longer period than runs 1 and 3 that did not contain Shellvis® 40. Runs 1 and 3 separated completely in only one day after they were kept undisturbed. However, after 42 days, runs 2 and 4 remained stable and flowable.

The results shown in the above examples clearly demonstrate that the present invention is well adapted to carry out the objects and attain the end and advantages mentioned as well as those inherent therein. While modifications may be made by those skilled in the art, such modifications are encompassed within the spirit of the present invention as defined by the specification and the claims.

That which is claimed:

1. A stable liquid suspension composition comprising a liquid carrier, a solid fatty acid or a salt thereof, and a solid particulate wherein said liquid carrier is selected from the group consisting of oils, liquid alkenes, terpenes, glycols, esters, ethers, alcohols, and combinations of any two or more thereof; said liquid carrier, solid fatty acid or salt thereof, and solid particulate are each present in said composition in a stabilizing amount sufficient to produce a stable liquid suspension; and said solid particulate is selected from the group consisting of polymers, herbicides, insecticides, sulfonated asphalt, salts of sulfonated asphalt, lime, sodium bicarbonate, sodium carbonate, molybdenum disulfide, sodium hydroxide, graphite, zinc, tin, quebracho, lignin, lignite, caustisized lignite, lignosulfonate, chrome lignosulfonate, naphthalenesulfonate, unintahite (gilsonite), and combinations of two or more thereof.

2. A composition according to claim 1 wherein said liquid carrier is selected from the group consisting of mineral oil, vegetable oils, crude oil, diesel, kerosene, pentane, decane, soybean oil, corn oil, decenes, dodecenes, tridecenes, tetradecenes, pentadienes, hexadecenes, octadecenes, eicosene, docosene, pentacosene, hexacosene, hexanol, octanol, decanol, isopropyl alcohol, alcohol alkoxylates, pentyl acetate, isopentyl acetate, benzyl acetate, ethyl otanoate, ethyl decanoate, ethyl dodecanoate, ethyl malonate, ethyl phenylacetate, ethyl benzoate, phenyl propionate, limonene, menthol, piperitone, menthyl acetate, neomenthol, pulegone, spearmint ((−)-carvone), carvyl acetates, cornmint, scotch mint, peppermint, α-pinene, β-pinene, linalool, nerol, α-terpinene, menthofuran, β-terpinene, γ-terpinene, myrcene, geraniol, geranial, neral, citronellal, menthone, isomenthone, 1,8-cineole, ascaridole, bornneol flavonone, terpinolene, sabinene, camphene, citronellol, ethylene glycol, propylene glycol, diethylene glycol, dipropylene glycol, polyethylene glycol, polypropylene glycol, and combinations of any two or more thereof.

3. A composition according to claim 1 wherein said liquid carrier is a mineral oil.

4. A composition according to claim 1 wherein said liquid carrier is a polypropylene glycol polymer.

5. A composition according to claim 1 wherein said liquid carrier is a mixture of a liquid alkene and a paraffin.

6. A composition according to claim 1 wherein said fatty acid or salt thereof has 12 to 20 carbon atoms per molecule.

7. A composition according to claim 1 wherein said salt of fatty acid is calcium stearate.

8. A composition according to claim 1 wherein said solid particulate is a herbicide.

9. A composition according to claim 1 wherein said solid particulate is a polymer.

10. A composition according to claim 9 wherein said polymer is selected from the group consisting of polysaccharides, cellulose; cellulose ethers, acrylamide-based polymers, polyacrylonitrile polystyrene sulfonate, lignosulfonate, and combinations of any two or more thereof.

11. A composition according to claim 9 wherein said polymer is a carboxymethyl cellulose.

12. A composition according to claim 9 wherein said polymer is an acrylamide-containing polymers having repeat units derived from acrylamide and an olefinic comonomer.

13. A composition according to claim 9 wherein said polymer is a copolymer of acrylamide and sodium 2-acrylamido-2-methylpropane sulfonate.

14. A stable liquid suspension composition comprising a liquid carrier, a solid fatty acid or a salt thereof, and a solid particulate wherein said liquid carrier, solid fatty acid or salt thereof, and solid particulate are each present in said composition in a stabilizing amount sufficient to produce a stable liquid suspension;

said liquid carrier is selected from the group consisting of mineral oil, vegetable oils, crude oil, diesel, kerosene, pentane, decane, soybean oil, corn oil, decenes, dodecenes, tridecenes, tetradecenes, pentadienes, hexadecenes, octadecenes, eicosene, docosene, pentacosene, hexacosene, hexanol, octanol, decanol, isopropyl alcohol, alcohol alkoxylates, carboxylic esters, phenolic esters, malonic esters, sulfonic esters, limonene, menthol, piperitone, menthyl acetate, neomenthol, pulegone, spearmint ((−)-carvone), carvyl acetates, cornmint, scotch mint, peppermint, α-pinene, β-pinene, linalool, nerol, α-terpinene, menthofuran, β-terpinene, γ-terpinene, myrcene, geraniol, geranial, neral, citronellal, menthone, isomenthone, 1,8-cineole, ascaridole, bornneol flavonone, terpinolene, sabinene, camphene, citronellol, ethylene glycol, propylene glycol, diethylene glycol, dipropylene glycol, polyethylene glycol, polypropylene glycol, and combinations of any two or more thereof;

said fatty acid or salt thereof has 12 to 20 carbon atoms per molecule;

said solid particulate is selected from the group consisting of polymers, herbicides, insecticides, sulfonated asphalt, salts of sulfonated asphalt, lime, sodium bicarbonate, sodium carbonate, molybdenum disulfide, sodium hydroxide, graphite, zinc, tin, quebracho, lignin, lignite, caustisized lignite, lignosulfonate, chrome lignosulfonate, naphthalenesulfonate, unintahite (gilsonite), and combinations of two or more thereof; and said polymer is selected from the group consisting of polysaccharides, cellulose; cellulose ethers, acrylamide-based polymers, polyacrylonitrile, polystyrene sulfonate, lignosulfonate, and combinations of any two or more thereof.

15. A composition according to claim 14 wherein said liquid carrier is a polypropylene glycol polymer; said salt of fatty acid is calcium stearate; and said polymer is a carboxymethyl cellulose.

16. A composition according to claim 14 wherein said liquid carrier is a polypropylene glycol polymer; said salt of fatty acid is calcium stearate; and said polymer is a copolymer of acrylamide and sodium 2-acrylamido-2-methylpropane sulfonate.

17. A stable liquid composition comprising a liquid carrier selected from the group consisting of mineral oil, polypropylene glycol, liquid alkene, paraffin, and combinations of two or more thereof, calcium stearate; and a solid particulate selected from herbicide, polymer, and combinations thereof wherein said liquid carrier, calcium stearate, and solid particulate are each present in said composition in a stabilizing amount sufficient to effect the formation of a stable liquid suspension.

18. A composition according to claim 17 wherein said liquid carrier is polypropylene glycol and solid particulate is a copolymer of acrylamide and sodium 2-acrylamido-2-methylpropane sulfonate.

19. A composition according to claim 17 wherein said liquid carrier is polypropylene glycol and solid particulate is a carboxy methyl cellulose.

* * * * *